United States Patent
Uhler (10) Patent No.: US 8,944,229 B2
(45) Date of Patent: Feb. 3, 2015

(54) CLUTCH HOUSING WITH WIDE LEVER SPRING RETENTION SLOTS AND CLUTCH HOUSING WITH AXIALLY OFF-SET TABS

(75) Inventor: Adam Uhler, Sterling, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1792 days.

(21) Appl. No.: 11/706,656

(22) Filed: Feb. 15, 2007

(65) Prior Publication Data

US 2007/0193845 A1  Aug. 23, 2007

Related U.S. Application Data

(60) Provisional application No. 60/775,620, filed on Feb. 22, 2006, provisional application No. 60/775,619, filed on Feb. 22, 2006, provisional application No. 60/775,621, filed on Feb. 22, 2006, provisional application No. 60/775,622, filed on Feb. 22, 2006, provisional application No. 60/775,623, filed on Feb. 22, 2006.

(51) Int. Cl.
*F16D 13/56* (2006.01)
*F16D 21/06* (2006.01)
*F16D 13/58* (2006.01)

(52) U.S. Cl.
CPC .............. *F16D 13/56* (2013.01); *F16D 13/585* (2013.01)
USPC ..................... 192/48.8; 192/70.19; 192/70.27

(58) Field of Classification Search
CPC ....... F16D 13/56; F16D 12/585; F16D 25/10; F16D 21/06
USPC ............ 192/70.19, 70.12, 87.11, 89.24, 112, 192/70.2, 48.619, 48.8–48.91
See application file for complete search history.

(56) References Cited

U.S. PATENT DOCUMENTS

| | | | |
|---|---|---|---|
| 2,976,569 A | 6/1959 | Quere et al. | |
| 3,009,553 A | 11/1961 | Henyon | 192/48 |
| 3,291,272 A | 12/1966 | Fawick | 192/84 |
| 4,111,291 A | 9/1978 | Horstman | 192/105 C |
| 5,875,536 A | 3/1999 | Ring | 29/407.1 |
| 6,196,078 B1 | 3/2001 | DeJonge et al. | 74/473.12 |
| 6,497,158 B1 | 12/2002 | Daly et al. | 73/866.5 |

(Continued)

FOREIGN PATENT DOCUMENTS

| | | |
|---|---|---|
| DE | 2608348 | 9/1976 |
| DE | 4343112 | 6/1995 |

(Continued)

*Primary Examiner* — Gene Crawford
*Assistant Examiner* — Terry Chau
(74) *Attorney, Agent, or Firm* — Simpson & Simpson, PLLC (57) ABSTRACT

The present invention broadly comprises a clutch housing including a substantially cylindrical housing wall and an opening in the housing wall. The opening is operatively arranged to accept at least a portion of a lever spring for a clutch assembly and at least a portion of a protrusion for a torque-transmitting element in the assembly. The present invention also broadly comprises a clutch housing including a first and second protrusions extending from a substantially cylindrical housing wall, axially displaced from each other, and arranged to engage a torque-transmitting element in a clutch assembly. The first protrusion is arranged to receive torque from the element and to support the clutch housing in an axial direction. The second protrusion is arranged to pre-load a lever spring. The present invention further includes a clutch assembly with the preceding clutch housings.

16 Claims, 8 Drawing Sheets

Fig. 8

(56) References Cited

U.S. PATENT DOCUMENTS

| | | | |
|---|---|---|---|
| 6,533,705 B1 | 3/2003 | Giefer et al. | 477/96 |
| 6,588,294 B1 | 7/2003 | Rogg | 74/473.21 |
| 6,708,807 B1 | 3/2004 | Martin | 192/70.19 |
| 6,819,997 B2 | 11/2004 | Buchanan et al. | 701/67 |
| 6,976,569 B2 | 12/2005 | Khaykin et al. | 192/220.4 |
| 7,287,634 B2 * | 10/2007 | Agner et al. | 192/87.11 |
| 7,823,711 B2 * | 11/2010 | Uhler et al. | 192/48.8 |
| 7,854,306 B2 * | 12/2010 | Uhler et al. | 192/48.8 |
| 2005/0139442 A1 | 6/2005 | Agner et al. | 192/48.8 |
| 2005/0279604 A1* | 12/2005 | Vetter et al. | 192/48.8 |
| 2007/0144857 A1* | 6/2007 | Tsukada et al. | 192/48.8 |
| 2007/0193850 A1* | 8/2007 | Sturgin et al. | 192/212 |

FOREIGN PATENT DOCUMENTS

| | | |
|---|---|---|
| DE | 4408666 | 9/1995 |
| DE | 19941837 | 2/2001 |
| DE | 10241513 | 3/2004 |
| DE | 10338558 | 3/2004 |
| DE | 10301405 A1 * | 7/2004 |
| DE | 10334867 | 2/2005 |
| DE | 102005027610 | 12/2005 |
| EP | 0812998 | 8/2001 |
| EP | 1422430 | 5/2004 |
| EP | 1610021 | 12/2005 |
| FR | 2851626 | 8/2004 |
| JP | 63214524 | 9/1988 |

* cited by examiner

CLUTCH HOUSING WITH WIDE LEVER SPRING RETENTION SLOTS AND CLUTCH HOUSING WITH AXIALLY OFF-SET TABS

CROSS-REFERENCE TO RELATED APPLICATIONS

This application claims the benefit under 35 U.S.C. §119 (e) of U.S. Provisional Application No. 60/775,620 filed Feb. 22, 2006; U.S. Provisional Application No. 60/775,619 filed Feb. 22, 2006; U.S. Provisional Application No. 60/775,621 filed Feb. 22, 2006; U.S. Provisional Application No. 60/775,622 filed Feb. 22, 2006; and U.S. Provisional Application No. 60/775,623 filed Feb. 22, 2006.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a clutch housing with wide slots for retaining a lever spring and to a clutch housing with axially offset tabs arranged to pre-load a spring.

BACKGROUND OF THE INVENTION

Commonly assigned, and therefore, uncitable, U.S. Provisional Patent Application titled "CLUTCH HOUSING WITH LEVER SPRING RETENTION SLOTS AND METHOD OF INSTALLING A LEVER SPRING," inventors Todd Sturgin and Adam Uhler, filed on the same day as the present application, shows the use of slots to retain a lever spring in a mechanically actuated clutch assembly. The clutch housing could be improved if the slots in the housings for the springs could be made wider, enabling the use of a more robust punch. Commonly assigned, and therefore, uncitable, United States Patent Application No. 2005/0139442 filed Dec. 23, 2004 and published Jun. 30, 2005, which application is incorporated herein by reference as background information, shows the use of lever springs in a mechanically actuated clutch assembly. A clutch assembly could be improved if springs were preloaded.

Thus, there is a long-felt need for a housing with wider spring slots and improved spring preloading.

BRIEF SUMMARY OF THE INVENTION

The present invention broadly comprises a clutch housing including a substantially cylindrical housing wall and an opening in the housing wall. The opening is operatively arranged to accept at least a portion of a lever spring for a clutch assembly and at least a portion of a protrusion for a torque-transmitting element in the assembly. The opening defines a first edge and the at least a portion of a lever spring is arranged to contact the first edge. In some aspects, the at least a portion of a protrusion is arranged to contact the at least a portion of a lever spring and preload the lever spring. In some aspects, the opening comprises an axial width, the wall comprises a thickness, and the axial width is greater than the thickness. In some aspects, the opening defines a second edge and the at least a portion of a protrusion is arranged to contact the second edge. Then, the wall is arranged to accept torque and to transfer the torque to the at least a portion of a protrusion. In some aspects, the torque-transmitting element is an inner clutch housing.

The present invention also broadly comprises a clutch housing including a first and second protrusions extending from a substantially cylindrical housing wall. The second protrusion is axially displaced from the first protrusion and the first and second protrusions are arranged to engage a torque-transmitting element in a clutch assembly. In some aspects, the torque-transmitting element includes a first plurality of openings with respective first edges and the first protrusion is arranged to engage the first edges. In some aspects, the first protrusion is arranged to receive torque and support the clutch housing in an axial direction.

In some aspects, the assembly includes a lever spring, the torque-transmitting element includes a second plurality of openings with respective second edges, and the second protrusion is arranged to urge at least a portion of the lever spring against the second edges. Then, the second protrusion is arranged to preload the lever spring. In some aspects, the second protrusion is arranged to receive torque from the torque-transmitting element. In some aspects, the housing includes a longitudinal end and the first and second protrusions are first and second tabs, respectively, arranged proximate the longitudinal end. In some aspects, the housing includes respective pluralities of the first and second protrusions. In some aspects, the torque-transmitting element is an outer clutch housing.

The present invention further broadly comprises a clutch assembly including an inner clutch housing with first and second protrusions extending radially outward from a substantially cylindrical inner housing wall and axially displaced one to the other and an outer clutch housing with a plurality of openings in a substantially cylindrical outer housing wall. The first and second protrusions are at least partially engaged with the plurality of openings.

In some aspects, the assembly includes a lever spring engaged with the plurality of openings, the plurality of openings includes respective first edges, and the first protrusion urges the spring against the first edges. Then, the first protrusion is arranged to preload the lever spring. In some aspects, the first protrusion is arranged to receive torque from the outer clutch housing. In some aspects, the plurality of openings includes respective second edges and the second protrusion is arranged to contact the second edges. Then, the outer clutch housing is arranged to accept torque and the second protrusion is arranged to accept the torque from the outer clutch housing and to support the inner clutch housing in an axial direction. In some aspects, the inner clutch housing includes a longitudinal end and the first and second protrusions are first and second tabs, respectively, disposed proximate the longitudinal end. In some aspects, the first and second protrusions are part of respective pluralities.

It is a general object of the present invention to provide a clutch housing able to be formed with a more robust punch, particularly for circumferential openings.

It is another object of the present invention to provide a clutch housing arranged to preload a lever spring.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described. In the figures below, front refers to the side facing an engine to which a clutch assembly is connected. It should be understood that front also can refer to the side facing a transmission to which a clutch assembly is connected.

Figure 1:
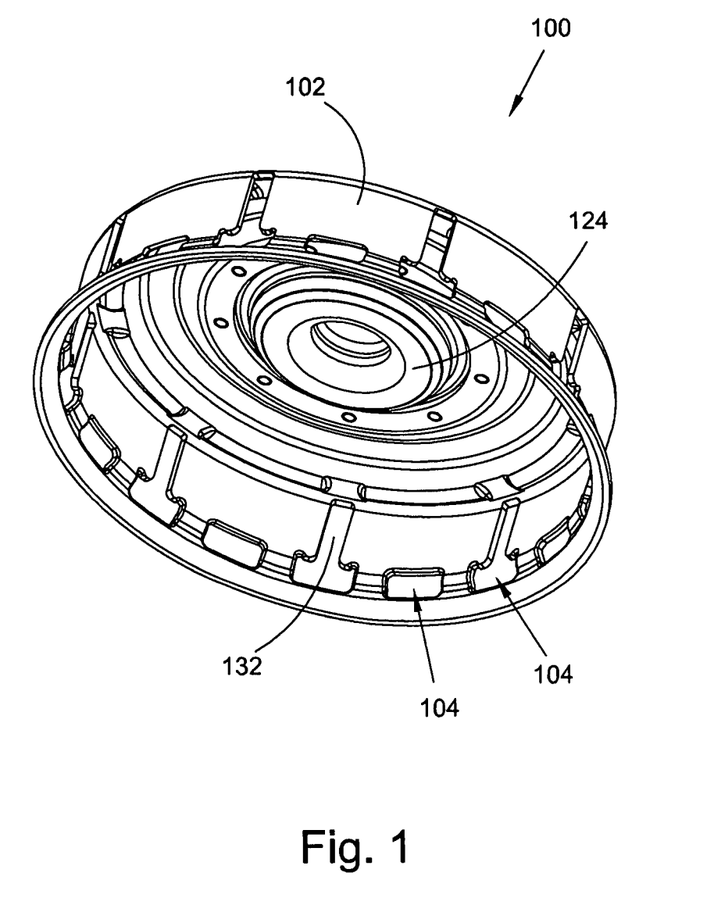
FIG. 1 is a perspective back view of a clutch housing with present invention spring retention openings.

FIG. 1 is a perspective back view of clutch housing 100 with present invention spring retention openings.

Figure 2:
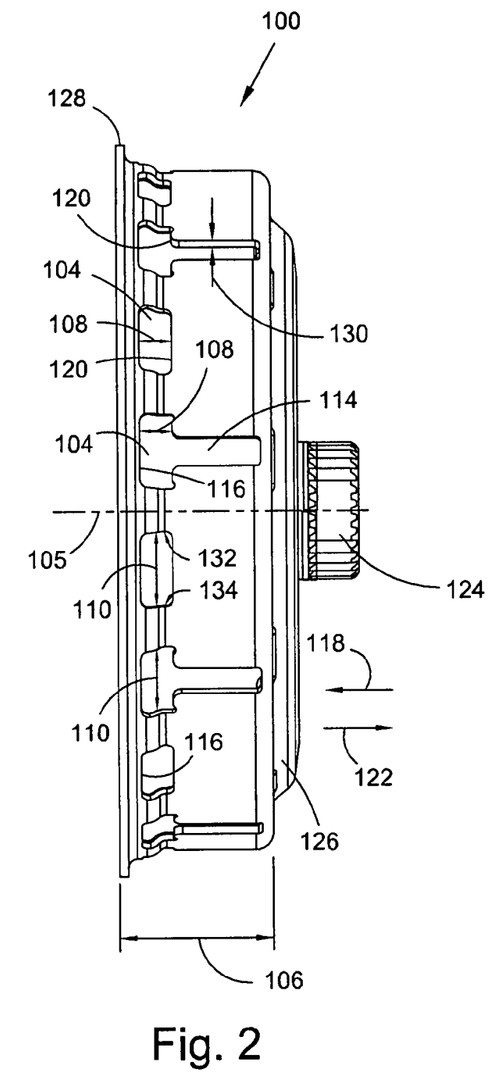
FIG. 2 is a side view of the housing of FIG. 1.

FIG. 2 is a side view of clutch housing 100. The following should be viewed in light of FIGS. 1 and 2. Clutch housing 100 includes housing wall 102, openings 104 in wall 102, and longitudinal axis 105. Wall 102 is disposed circumferentially about axis 105. That is, in general, wall 102 is cylindrical in shape. However, it should be understood that wall 102 is not limited to the shape shown in the figures and that other shapes for wall 102 are included within the spirit and scope of the invention as claimed. For example, wall 102 is not limited to a particular height 106.

Openings 104 are not limited to the shape shown in the figures. Other shapes for openings 104 are possible and are included within the spirit and scope of the invention as claimed. For example width 108 and length 110 of openings 104 can be varied. In some aspects, openings 104 are slots circumferentially aligned with wall 102. That is length 110 is greater than width 108 and the length is aligned with a circumference of the housing. Also, housing 100 is not limited to the number of openings 104 shown. In some aspects, at least some of openings 104 include extension 114. Housing 100 is not limited to any particular ratio of openings 104 with and without extensions 114. Housing 100 also is not limited to any shape or size of extensions 114.

As shown infra, openings 104 are operatively arranged to accept at least a portion of a lever spring (not shown) for a clutch assembly (not shown) and at least a portion of a protrusion for a torque-transmitting element (not shown) in the assembly. In some aspects, the torque-transmitting element is an inner clutch housing. Openings 104 include first or back edges 116 and at least a portion of the lever spring is arranged to contact the back edge. In some aspects, at least a portion of the protrusion is arranged to contact the at least a portion of the lever spring. In some aspects, the at least a portion of the protrusion is arranged to preload the lever spring. In some aspects, housing 100 is arranged to accept torque and to transfer the torque to the at least a portion of the protrusion.

Openings 104 also define second or front edges 120. At least a portion of the protrusion is arranged to contact the front edge. In some aspects, housing 100 is arranged to accept torque and to transfer the torque to the at least a portion of the protrusion and the at least a portion of the protrusion is arranged to support the housing in axial direction 122.

In some aspects, housing 100 includes hub 124. End wall 126 extends to hub 124 and in some aspects; end wall 126 is connected to the hub using extruded rivets, a relatively cost-effective process. However, it should be understood that other methods, such as separate rivets or mechanical fasteners, or welding, can be used to secure end wall 126 and hub 124.

Figure 3:
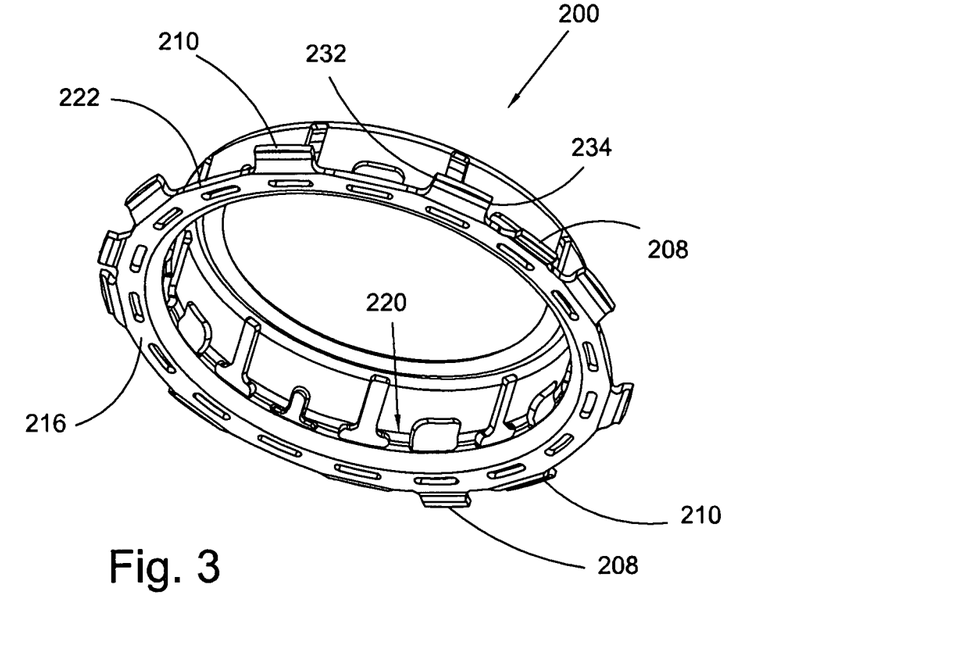
FIG. 3 is a perspective back view of a clutch housing with present invention radial protrusions.

FIG. 3 is a perspective back view of clutch housing 200 with present invention radial protrusions.

Figure 4:
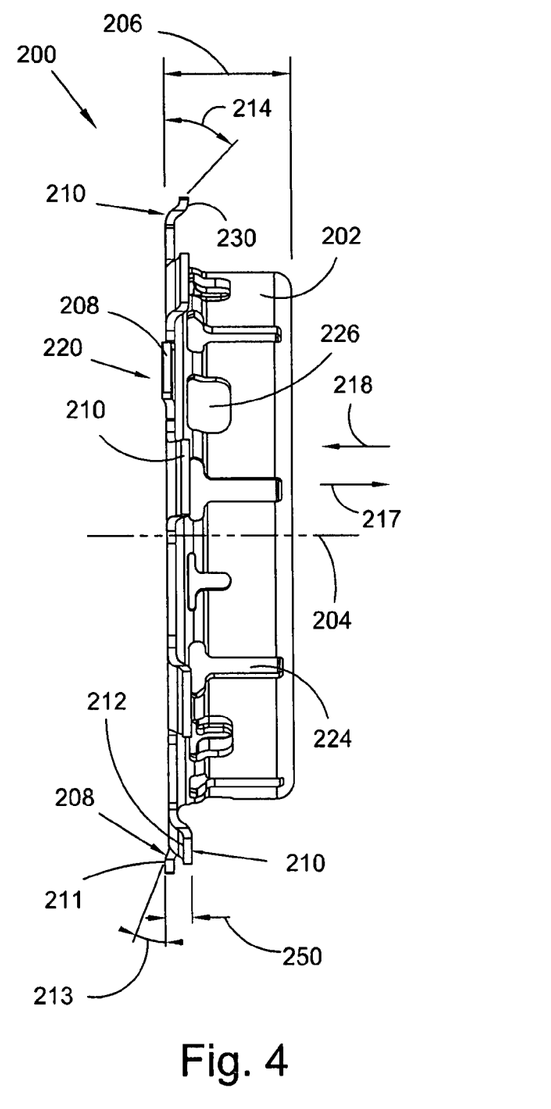
FIG. 4 is a side view of the housing of FIG. 3.

FIG. 4 is a side view of housing 200 of FIG. 3. The following should be viewed in light of FIGS. 3 and 4. Clutch housing 200 includes housing wall 202 and longitudinal axis 204. Wall 202 is disposed circumferentially about axis 204. That is, in general, wall 202 is cylindrical in shape. However, it should be understood that wall 202 is not limited to the shape shown in the figures and that other shapes for wall 202 are included within the spirit and scope of the invention as claimed. For example, wall 202 is not limited to a particular height 206.

Housing 200 includes protrusions 208 and 210 extending from wall 204. The protrusions are off-set with respect to axis 204. For example, first or back surfaces 211 of protrusions 208 and second or back surfaces 212 of protrusions 210 are not in a same radial plane with respect to the axis. The present invention is not limited to any particular axial off-set between the protrusions. In some aspects, at least portions of protrusions 208 and 210 are oriented at angles 213 and 214, respectively, with respect to radial plane orthogonal to axis 204. In some aspects, surface 216 approximates this plane. The protrusions are arranged to engage a torque-transmitting element (not shown) in a clutch assembly (not shown). In some aspects, the torque-transmitting element is an outer clutch housing.

In some aspects, angles 213 and 214 have different respective polarities. For example, as shown in FIG. 4, one angle is positive and the other angle is negative with respect to surface 216. It should be understood that positive and negative are relative terms. For example, angle 213 is measured to the left of the radial plane in FIG. 4 and angle 214 is measured to the right of the plane in FIG. 4. Therefore, in one orientation, angle 213 is positive with respect to the plane and angle 214 is negative with respect to the plane. In another orientation, the polarities of angles 213 and 214 are reversed. Alternately stated, angles 213 and 214 diverge from opposite sides of a central reference plane. Angles 213 and 214 are not limited to any particular magnitude. Angles 213 and 214 may have the same or different magnitudes.

Figure 4A:
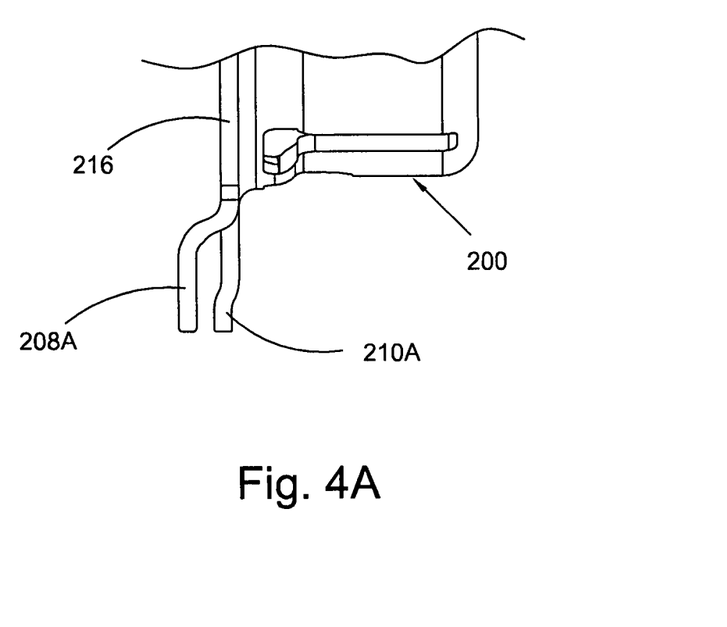
FIG. 4A is a partial side view of a present invention clutch housing showing another orientation of protrusions.

FIG. 4A is a partial side view of present invention clutch housing 200 showing another orientation of protrusions. The following should be viewed in light of FIGS. 3 through 4A. In some aspects, the protrusions are radially off-set on the same side of a radial plane for the housing. For example, in FIG. 4A, protrusions 208A and 210A are on the same side of surface 216.

Returning to FIGS. 3 and 4, in some aspects, housing 200 includes respective pluralities of protrusions 208 and 210. Housing 200 is not limited to any number of protrusions in the respective pluralities. Housing 200 also is not limited to any ratio of protrusions 208 and 210. In some aspects, housing 200 includes 3 protrusions 208. In some aspects, the outer clutch housing includes a plurality of openings with edges and protrusions 210 are arranged to engage the edges, to receive torque from the outer clutch housing, and to support clutch housing 200 in axial direction 217.

In some aspects, the assembly includes a lever spring, the plurality of openings comprises other edges, and protrusion 208 is arranged to urge at least a portion of the lever spring against the other edges. Protrusion 208 is arranged to preload the lever spring. It should be understood that protrusions 208 also can accept torque from the torque-transmitting element. Protrusions 208 and 210 are disposed or located near longitudinal end 220 of housing 200. In some aspects, the protrusions are respective tabs arranged radially outward, with respect to axis 204, proximate end 220. In some aspects, end 220 includes flange 222, from which the tabs extend.

The following should be viewed in light of FIGS. 1 through 4. In some aspects, housings 100 or 200 are stamped, reducing fabricating cost and complexity. However, it should be understood that other fabrication methods can be used to form housings 100 and 200. In some aspects, walls 102 and 202 are pierced after the forming process to create openings 104 and openings 224 and 226, respectively, eliminating the need for roll forming, with its attendant complexities and costs. Also, since the openings are made after the forming process, potential deformation and dimensional variation are reduced. Housing 100 also is formed with lip 128, which provides continuous support of housing 100, in particular, providing support to resist the hoop stresses to which housing 100 is subjected during use. Flange 222 performs a similar function in housing 200. In some aspects, openings in housings 100 and 200 enable addition flow of cooling fluid.

Figure 5:
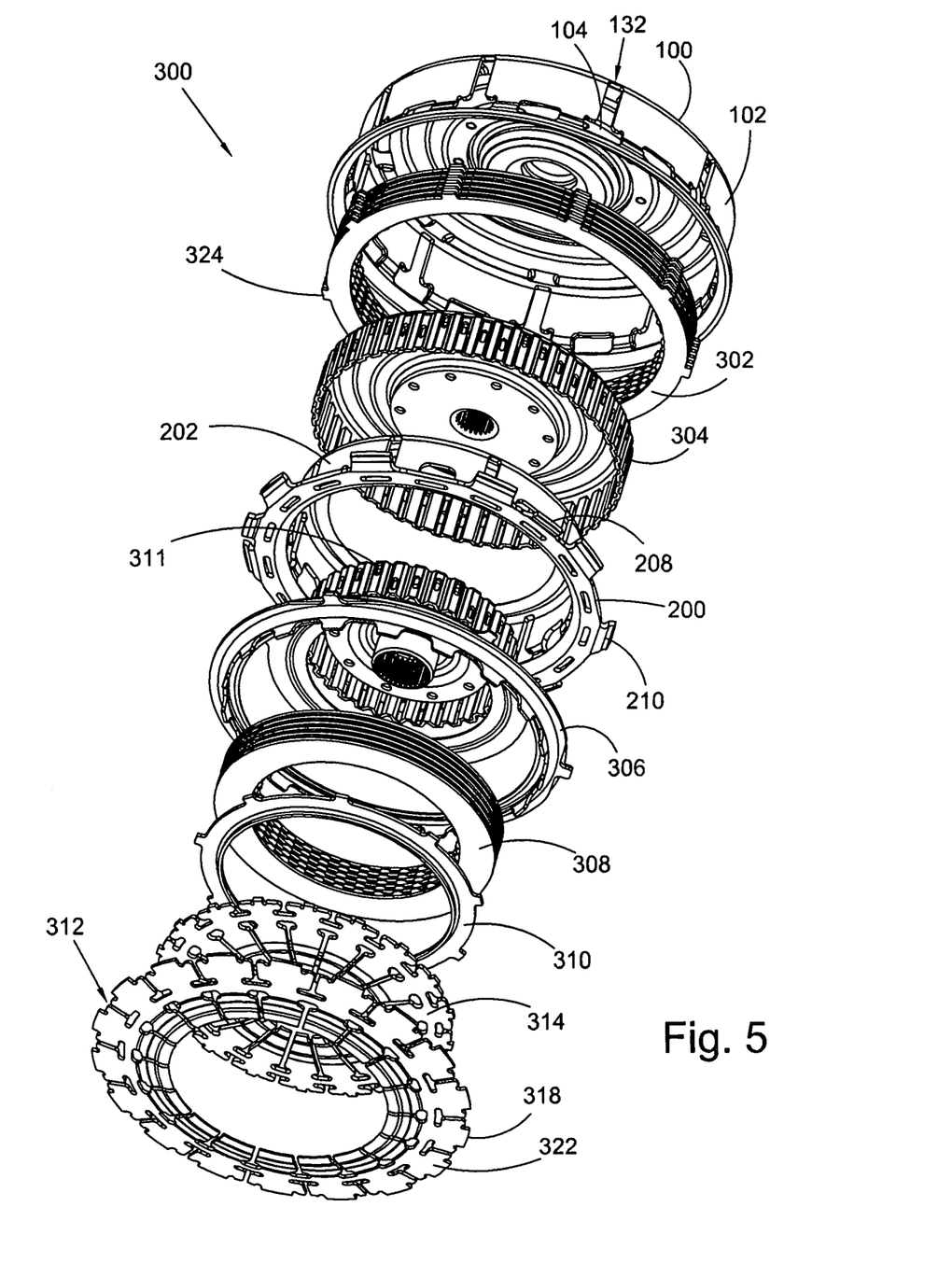
FIG. 5 is an exploded back view of a present invention dual clutch assembly.

FIG. 5 is an exploded back view of present invention dual clutch assembly 300.

Figure 6:
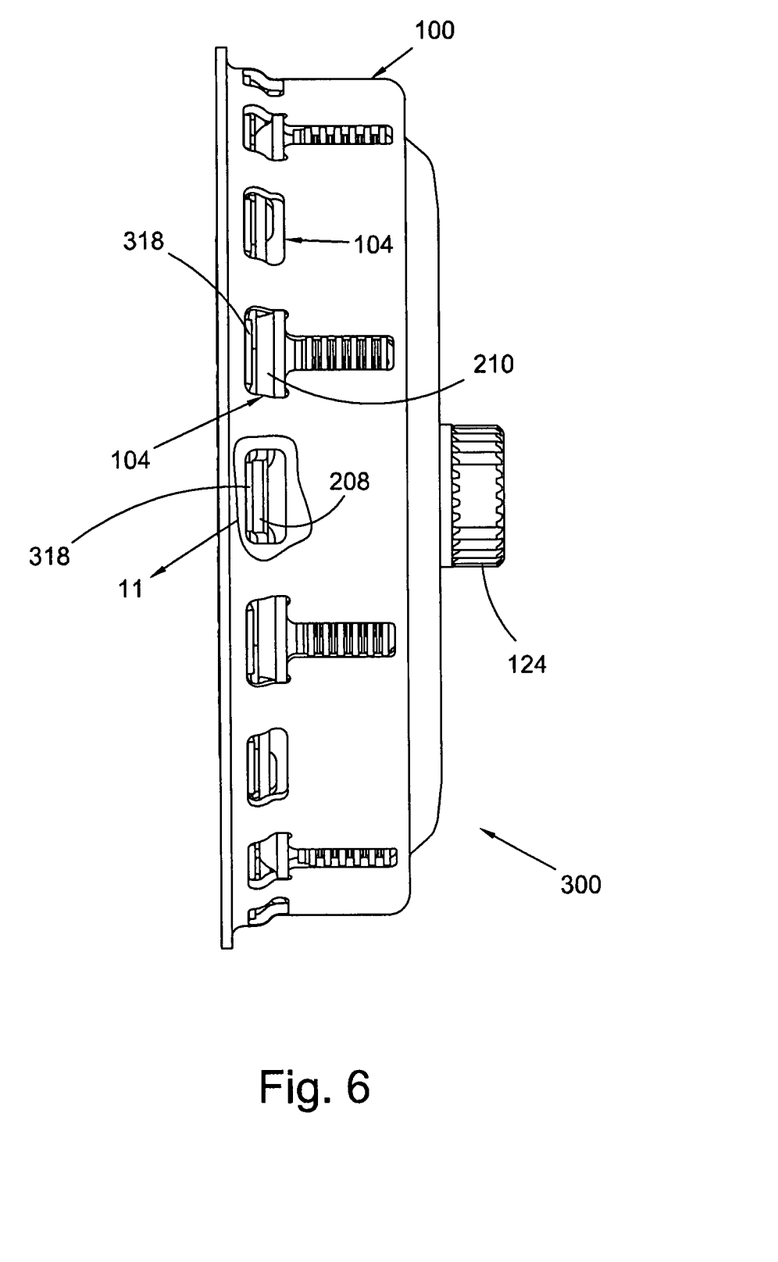
FIG. 6 is a side view of the assembly of FIG. 5.

FIG. 6 is a side view of assembly 300 of FIG. 5.

Figure 7:
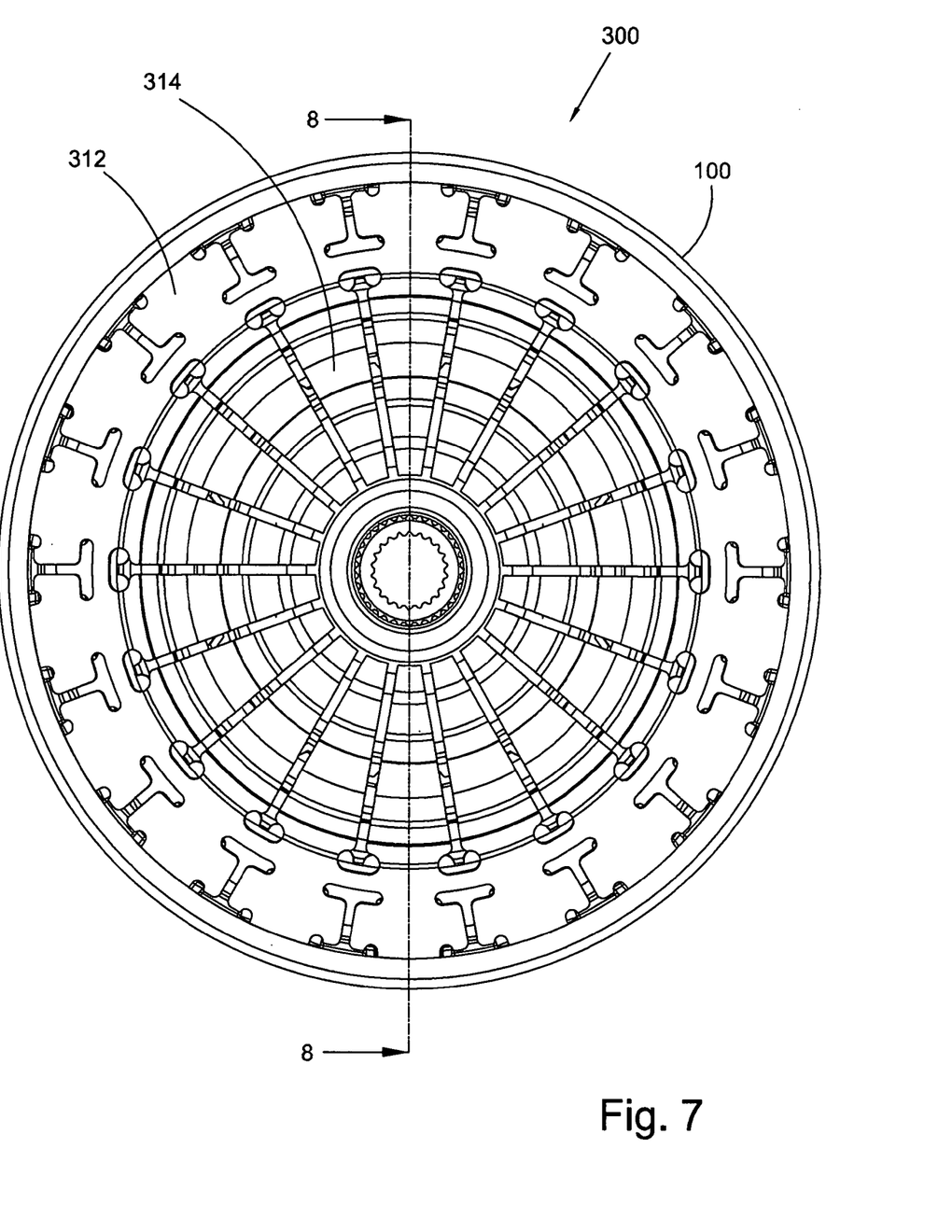
FIG. 7 is a back view of the assembly of FIG. 5.

FIG. 7 is a back view of assembly 300 of FIG. 5.

Figure 8:
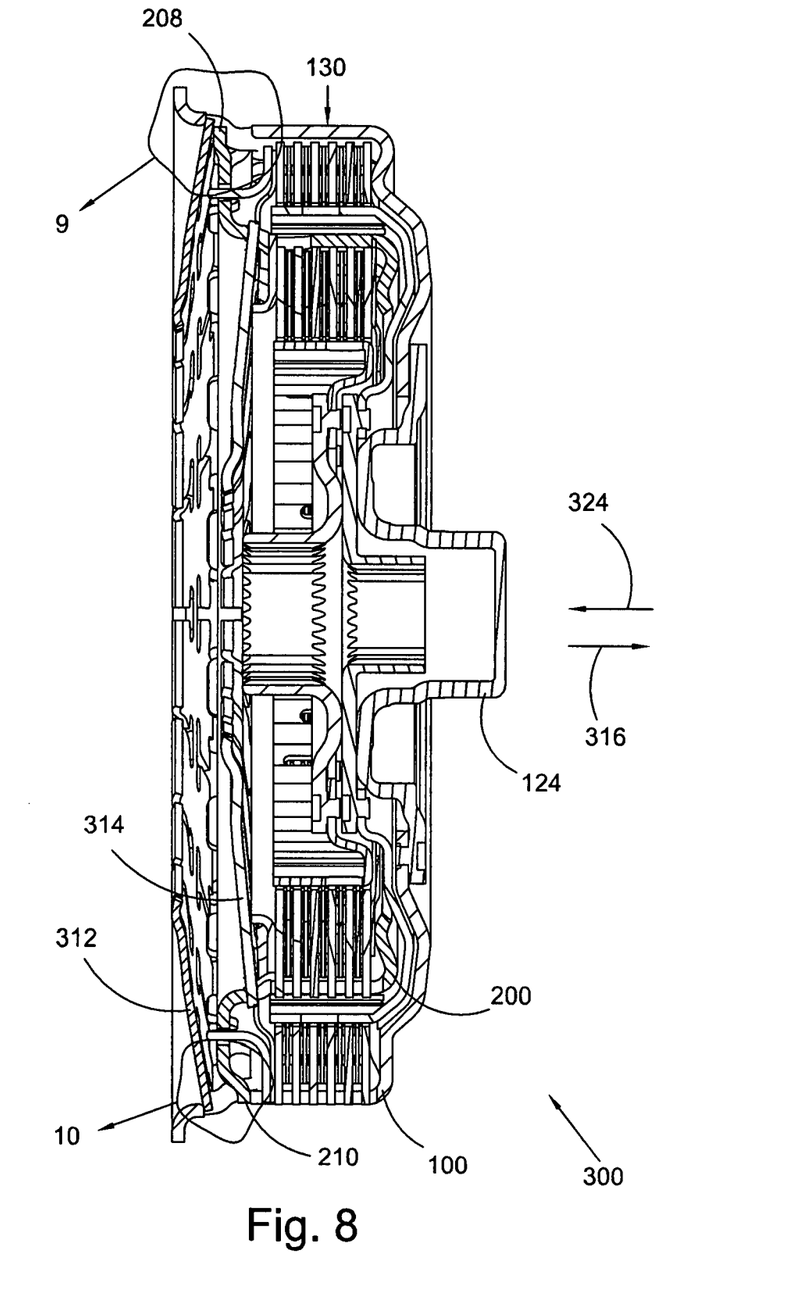
FIG. 8 is a cross-sectional view of the assembly of FIG. 5, along line 8-8 in FIG. 7.

FIG. 8 is a cross-sectional view of assembly 300 of FIG. 5, along line 8-8 in FIG. 7. The following should be viewed in light of FIGS. 1 through 8. Assembly 300 includes housings 100 and 200 and the description of housings 100 and 200, respectively, in FIGS. 1 and 2 and FIGS. 3, 4, and 4A is applicable to assembly 300. Housings 100 is an outer clutch housing in assembly 300 and housing 200 is an inner clutch housing in assembly 300. The discussions of inner and outer clutch housings in the descriptions for FIGS. 1 through 4A are applicable to assembly 300.

Assembly 300 can be formed in any way known in the art. In some aspects, clutch pack 302, carrier ring 304, and flow dam/fulcrum 306 are installed in housing 100. Pack 308, fulcrum 310, and carrier ring 311 are installed in housing 200. Plate springs 312 and 314 are used to engage clutch packs 302 and 308, respectively. However, it should be understood that the present invention is not limited to use with the number, type, and configuration of components shown for assembly 300 and other number, type, and configuration of components can be used with the present invention. Housing 200 includes protrusions 208 and 210, arranged radially outward with respect to substantially cylindrical wall 202. Clutch housing 100 includes a plurality of openings 104 in substantially cylindrical wall 102. Protrusions 208 and 210 are at least partially engaged with openings 104.

In some aspects, springs 312 and 314 are engaged with housings 100 and 200, respectively, as described in the commonly assigned U.S. Provisional Patent Application titled "CLUTCH HOUSING WITH LEVER SPRING RETENTION SLOTS AND METHOD OF INSTALLING A LEVER SPRING," inventors Todd Sturgin and Adam Uhler, filed on the same day as the present application.

It should be understood that any means known in the art, for example, complimentary splines and notches can be used to connect clutch pack 302 to housing 100. In addition, in some aspects, a tab and slot arrangement as described in the commonly assigned U.S. Provisional Patent Application titled "CLUTCH HOUSING WITH OPENINGS TO ENGAGE A CLUTCH PLATE," inventors Sturgin et al., filed on the same day as the present application, can be used. For example, tabs 324 of clutch pack 302 engage with slots 132 in housing 100.

Figure 9:
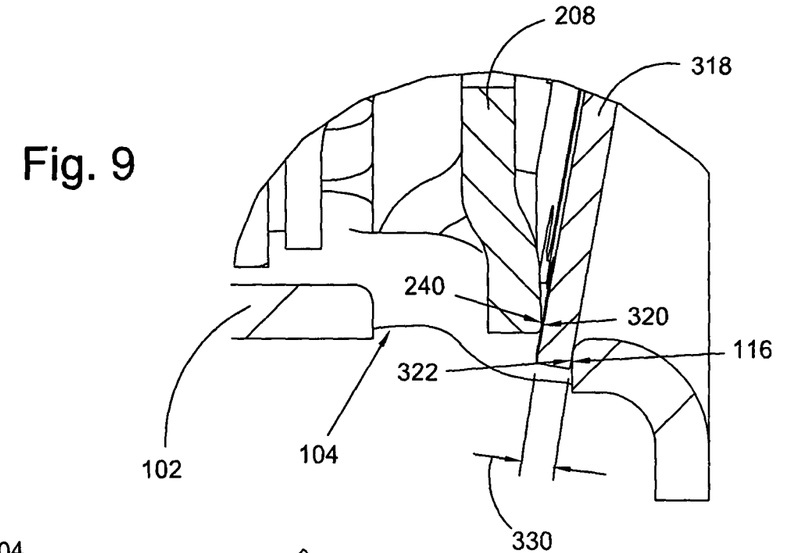
FIG. 9 is a detail of area 9 in FIG. 8.

FIG. 9 is a detail of area 9 in FIG. 8.

Figure 10:
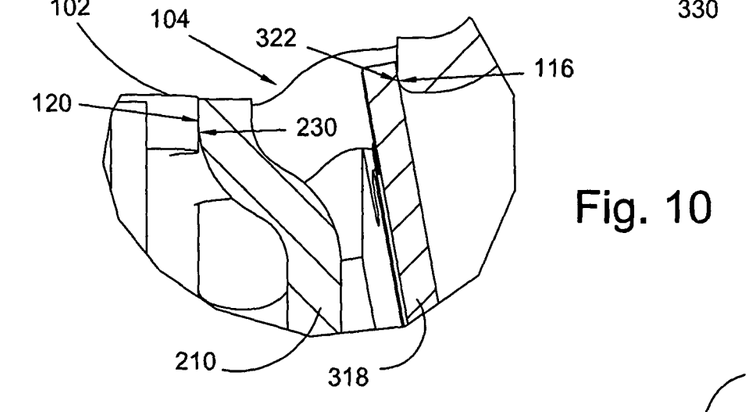
FIG. 10 is a detail of area 10 in FIG. 8.

FIG. 10 is a detail of area 10 in FIG. 8. The following should be viewed in light of FIGS. 1 through 10. Protrusions 208 also fit into openings 104 and urge tabs 318 of spring 312 against wall 102. Specifically, first or back surfaces 240 of the protrusions engage front surface 320 of the spring tabs, which forces back surface 322 of the spring tabs against surfaces 116 of the protrusions. Forcing surfaces 322 and 116 together preloads spring 312. Because of the inherent loading in spring 312, not all of tabs 318 need be engaged with protrusions 208 in order to engage all of tabs 318 with surfaces 116. That is, by forcing a limited number of tabs 318 against surfaces 116 with protrusions 208, the remaining tabs (not engaged with protrusions 208) also are forced against surfaces 116. For example, in FIG. 10 surfaces 116 and 320 are engaged. In general, a minority of protrusions extending from end 220 are protrusions 208, however, it should be understood that any number of protrusions in housing 200 can be protrusions 208.

Figure 11:
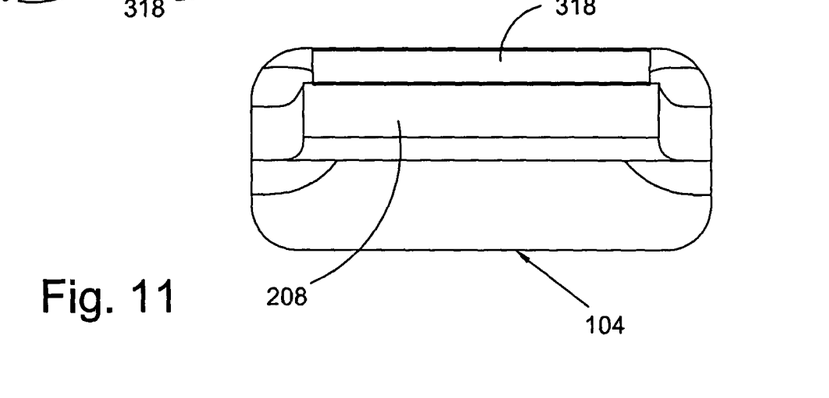
FIG. 11 is a detail of area 11 in FIG. 6.

FIG. 11 is a detail of area 11 in FIG. 6. The following should be viewed in light of FIGS. 1 through 11. Protrusions 210 fit into openings 104. Second or front surfaces 230 of protrusions 210 engage surfaces 120 of housing 100. The engagement of the front surfaces with surfaces 120 axially supports or stabilizes housing 200, specifically, in axial direction 316. That is, housing 200 cannot move further in direction 316 due to the engagement of the surfaces. Protrusions 210, in particular edges 232 and 234 are arranged to accept torque from housing 100 and to transfer that torque to housing 200. That is, as housing 100 rotates, edges 132 and 134 engage edges 232 and 234, respectively, depending on the direction of rotation. When clutch pack 308 is engaged, this torque is transferred to carrier 311. In general, the majority of the protrusions extending from end 220 are protrusions 210. However, it should be understood that any number of protrusions in housing 200 can be protrusions 210. It also should be understood that protrusions 208 can accept torque from housing 100.

Offset 250 between surfaces 230 and 240 advantageously enables an increase in width 108 of openings 104, for example increasing width 108 beyond thickness 130 of wall 102. For example, surfaces 116 and 120 are not both directly used to engage surfaces 320 and 322 of spring 312. That is, width 108 is not constrained to be substantially equal to thickness 330 of tabs 318. Instead, width 108 is based on the combination of offset 250 plus thickness 330. By increasing width 108, a more robust punch can be used to form openings 104.

It should be understood that any means known in the art can be used to adjust the clutch assemblies shown in the figures. In addition, in some aspects, the method described in the commonly assigned U.S. Provisional Patent Application titled "DUAL CLUTCH PACK DUAL OPERATING CLUTCH AND METHOD FOR ADJUSTING SAME," inventors Uhler et al., filed on the same day as the present application, can be used.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

I claim:

1. A clutch assembly comprising:
   an inner clutch housing with first and second protrusions extending radially outward from a substantially cylindrical inner housing wall and axially displaced from each other in an axial direction parallel to an axis of rotation for the clutch assembly, wherein the inner clutch housing and the first and second protrusions are formed from a first single piece of material;
   an outer clutch housing:
      formed of a second single piece of material separate from the first single piece of material; and,
      including:
         a first portion formed by a substantially cylindrical outer housing wall;
         a bell-shaped portion, continuous with the first portion; and,
         a plurality of openings, at least partially disposed in the substantially cylindrical outer housing wall, each opening in the plurality of openings formed by a respective continuous edge formed solely in the second single piece of material forming the outer clutch housing; and,
   a lever spring, wherein:
      respective portions of said first and second protrusions are engaged with said plurality of openings;
      each respective continuous edge further comprises a respective first portion;
      a portion of the lever spring is disposed, in a direction parallel to an axis of rotation for the clutch assembly, between the first protrusion and a respective first portion;
      the first protrusions urge the spring against the respective first portion,
      the plurality of openings penetrate through the outer housing wall;
      the respective first portion of said each respective continuous edge is formed by the bell-shaped portion; and,
      a respective second portion of said each respective continuous edge is formed by the substantially cylindrical outer housing wall.

2. The assembly of claim 1 wherein said first protrusion is arranged to preload said lever spring.

3. The assembly of claim 1 wherein said first protrusion is arranged to accept torque.

4. The assembly of claim 1 wherein said second protrusion is arranged to contact a respective second portion.

5. The assembly of claim 4 wherein said second protrusion is arranged to support said inner clutch housing in the axial direction.

6. The assembly of claim 1 wherein said respective first and second portions are axially offset in the axial direction.

7. The assembly of claim 1 wherein said inner clutch housing further comprises a longitudinal end and wherein said first and second protrusions are first and second tabs, respectively, disposed proximate said longitudinal end.

8. The assembly of claim 1 wherein said first and second protrusions comprise respective pluralities of said first and second protrusions.

9. A clutch assembly, comprising:
   an axis of rotation;
   an outer clutch housing including:
      a first housing wall;
      a first plurality of openings in the first housing wall, each opening in the first plurality of openings bound by a first respective continuous edge; and,
      a second plurality of openings in the first housing wall, each opening in the second plurality of openings bound by a second respective continuous edge;
   an inner clutch housing including:
      a second housing wall;
      a first plurality of protrusions, each protrusion in the first plurality of protrusions:
         extending outward in a radial direction, orthogonal to the axis of rotation, from the second housing wall; and,
         including a respective portion disposed in a respective first opening from the first plurality of openings and in contact with the first continuous edge of the respective first opening; and,
      a second plurality of protrusions, each protrusion in the second plurality of protrusions:
         extending outward in the radial direction from the second housing wall;
         located further in the axial direction than the first plurality of protrusions; and,
         including a respective portion disposed in a respective second opening from the second plurality of openings;
   a lever spring including:
      a third plurality of protrusions:
         extending outward in the radial direction; and,
         including respective portions disposed in the first plurality of openings and in contact with the first respective continuous edges; and,
      a fourth plurality of protrusions:
         extending outward in the radial direction; and,
         including respective portions:
            disposed in the second plurality of openings; and,
            in contact with the respective portions of the second plurality of protrusions and second respective continuous edges.

10. The clutch assembly of claim 9, wherein every protrusion extending radially outward from the second housing wall and at least partially disposed in the first or second pluralities of openings is included in the first and second pluralities of protrusions.

11. The clutch assembly of claim 9, wherein:
   the first respective continuous edges include first and second respective portions, the second respective portion separated from the first respective portion by a first respective space in an axial direction parallel to the axis of rotation;

the second respective continuous edges include third and fourth respective portions, the fourth respective portion separated from the third respective portion by a second respective space in the axial direction;

the respective portion of said each protrusion in the second plurality of protrusions is in contact with the first respective portion of the first continuous edge of the respective first opening;

the third plurality of protrusions are in contact with the second respective portions of the first plurality of openings; and, the fourth plurality of protrusion is in contact with the fourth respective portions of the second plurality of opening.

12. The clutch assembly of claim 9 further comprising:
a clutch pack including a fifth plurality of protrusions:
    extending outward in the radial direction; and,
    at least partly disposed in the first plurality of openings.

13. The clutch assembly of claim 9 wherein any circumferential line, defined by a radially outmost end of a respective radius of fixed length extending from the axis in the radial direction and swung about the axis 360 degrees, passes through respective radially outermost portions of the first plurality of protrusions without passing through respective radially outermost portion of the second plurality of protrusions.

14. A clutch assembly comprising:
an axis of rotation;
an outer clutch including:
    a first housing wall;
    a first opening penetrating and passing through the first housing wall; and,
    a second opening penetrating and passing through the first housing wall;
an inner clutch housing including:
    a second housing wall;
    a first protrusion:
        extending outward in a radial direction, orthogonal to the axis of rotation, from the second housing wall; and,
        including a portion disposed in the first opening;
    a second protrusion:
        extending outward, in the radial direction, from the first housing wall;
        located further in an axial direction, parallel to the axis of rotation, than the first protrusion; and,
        including a portion disposed in the second opening;
a lever spring including:
    a third protrusion:
        extending outward in the radial direction; and,
        including a portion at least partially disposed in the first opening; and,
    a fourth protrusion:
        extending outward in the radial direction; and,
        including a portion at least partially disposed in the second opening; and,
a clutch pack including a plurality of protrusions extending outward in the radial direction and at least partially disposed in the second opening.

15. The clutch assembly of claim 14, wherein no protrusion for the clutch pack, extending outward in the radial direction, is located in the second opening.

16. The clutch assembly of claim 14 wherein any circumferential line, defined by a radially outmost end of a respective radius of fixed length extending from the axis in the radial direction and swung about the axis 360 degrees, passes through respective radially outermost portions of the first plurality of protrusions without passing through respective radially outermost portion of the second plurality of protrusions.

* * * * *